US012264876B2

(12) United States Patent
Ikemiya et al.

(10) Patent No.: US 12,264,876 B2
(45) Date of Patent: Apr. 1, 2025

(54) REFRIGERATION APPARATUS FOR SHIPPING, AND SHIPPING CONTAINER

(71) Applicant: DAIKIN INDUSTRIES, LTD., Osaka (JP)

(72) Inventors: Makoto Ikemiya, Osaka (JP); Kouji Yamamoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 249 days.

(21) Appl. No.: 17/899,028

(22) Filed: Aug. 30, 2022

(65) Prior Publication Data

US 2022/0412646 A1 Dec. 29, 2022

Related U.S. Application Data

(63) Continuation of application No. PCT/JP2021/006639, filed on Feb. 22, 2021.

(30) Foreign Application Priority Data

Mar. 6, 2020 (JP) ................................. 2020-038887
Mar. 6, 2020 (JP) ................................. 2020-038888
Mar. 6, 2020 (JP) ................................. 2020-038889

(51) Int. Cl.
*F25D 11/00* (2006.01)
*F25D 29/00* (2006.01)

(52) U.S. Cl.
CPC .......... *F25D 29/005* (2013.01); *F25D 11/003* (2013.01); *F25D 2700/12* (2013.01)

(58) Field of Classification Search
CPC ... F25D 2700/12; F25D 11/003; F25D 29/005
See application file for complete search history.

(56) References Cited

U.S. PATENT DOCUMENTS 1,672,832 A * 6/1928 Spreen .................... G01K 1/20 374/141
6,089,110 A 7/2000 Pallotta et al.

FOREIGN PATENT DOCUMENTS

JP 26-7394 Y 7/1951
JP 55-112231 U 8/1980
JP 57-14031 U 1/1982
JP 58-82638 U 6/1983
JP 6-10779 U 2/1994
JP 8-122165 A 5/1996
JP 10-338291 A 12/1998

OTHER PUBLICATIONS

International Preliminary Report on Patentability and English translation of the Written Opinion of the International Searching Authority for International Application No. PCT/JP2021/006639, dated Sep. 15, 2022.

(Continued)

*Primary Examiner* — Nael N Babaa
(74) *Attorney, Agent, or Firm* — Birch, Stewart, Kolasch & Birch, LLP

(57) ABSTRACT

A guide member extends from an opening of a casing toward an internal space. The guide member guides the temperature sensor to the internal space. The detector and the lead wire of the temperature sensor are held by the guide member.

18 Claims, 15 Drawing Sheets

(56) References Cited

OTHER PUBLICATIONS

Extended European Search Report for corresponding European Application No. 21764462.4, dated Jun. 23, 2023.
Japanese Notice of Reasons for Refusal, issued in JP Application No. 2020-038888 dated Nov. 2, 2021.
International Search Report for PCT/JP2021/006639 mailed on May 18, 2021.
Written Opinion of the International Searching Authority for PCT/JP2021/006639 mailed on May 18, 2021.

* cited by examiner

REFRIGERATION APPARATUS FOR SHIPPING, AND SHIPPING CONTAINER

CROSS REFERENCE TO RELATED APPLICATIONS

This application is a Continuation of PCT International Application No. PCT/JP2021/006639, filed on Feb. 22, 2021, which claims priority under 35 U.S.C. 119 (a) to Patent Application No. 2020-038887, filed in Japan on Mar. 6, 2020, Patent Application No. 2020-038888, filed in Japan on Mar. 6, 2020, and Patent Application No. 2020-038889, filed in Japan on Mar. 6, 2020, all of which are hereby expressly incorporated by reference into the present application.

TECHNICAL FIELD

The present disclosure relates to a refrigeration apparatus for shipping and a shipping container.

BACKGROUND ART

Patent Document 1 discloses a configuration having a cylinder provided between an external wall and an internal wall and a temperature sensor arranged in the cylinder to measure the temperature of an internal space.

CITATION LIST

Patent Document

Patent Document 1: U.S. Pat. No. 6,089,110

SUMMARY

A first aspect of the present disclosure is directed to a refrigeration apparatus for shipping, including: a casing (11) to be attached to an open end of a container body (2) the casing (11) having an opening that allows an internal space (20) to communicate with outside; a temperature sensor (50) configured to detect a temperature of the internal space (20); and a guide member (60) that extends from the opening to the internal space (20) and guides the temperature sensor (50) to the internal space (20), wherein the temperature sensor (50) includes a detector (51) configured to detect the temperature of the internal space (20) and a lead wire (52) connected to the detector (51), and the guide member (60) holds the detector (51) and the lead wire (52).

DESCRIPTION OF EMBODIMENTS

An embodiment of the present disclosure will be described below with reference to the drawings. The following embodiment is merely an exemplary one in nature, and is not intended to limit the scope, applications, or use of the invention.

Embodiment

Figure 1:
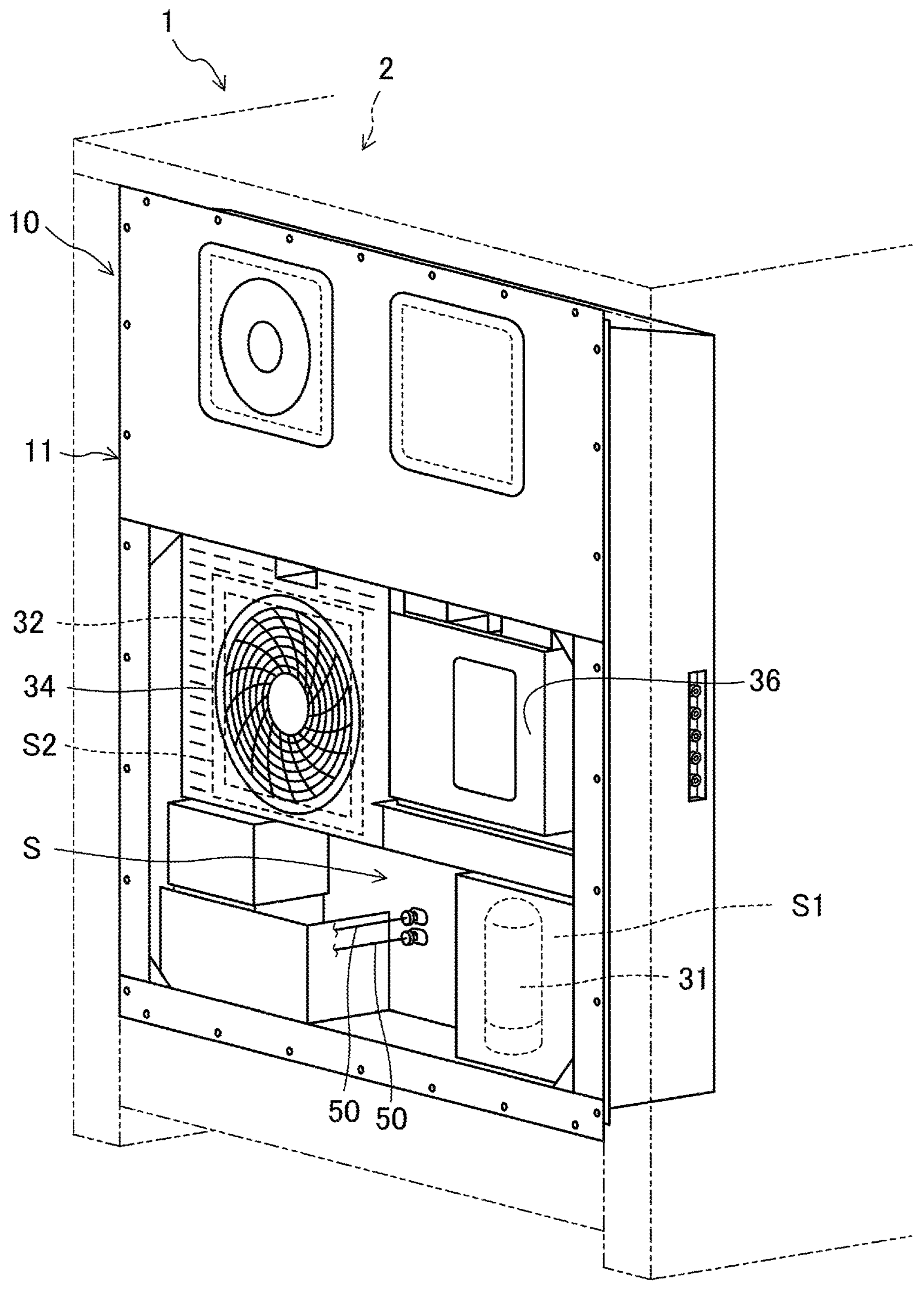
FIG. 1 is a perspective view illustrating a shipping container according to an embodiment as viewed from the front.
Figure 2:
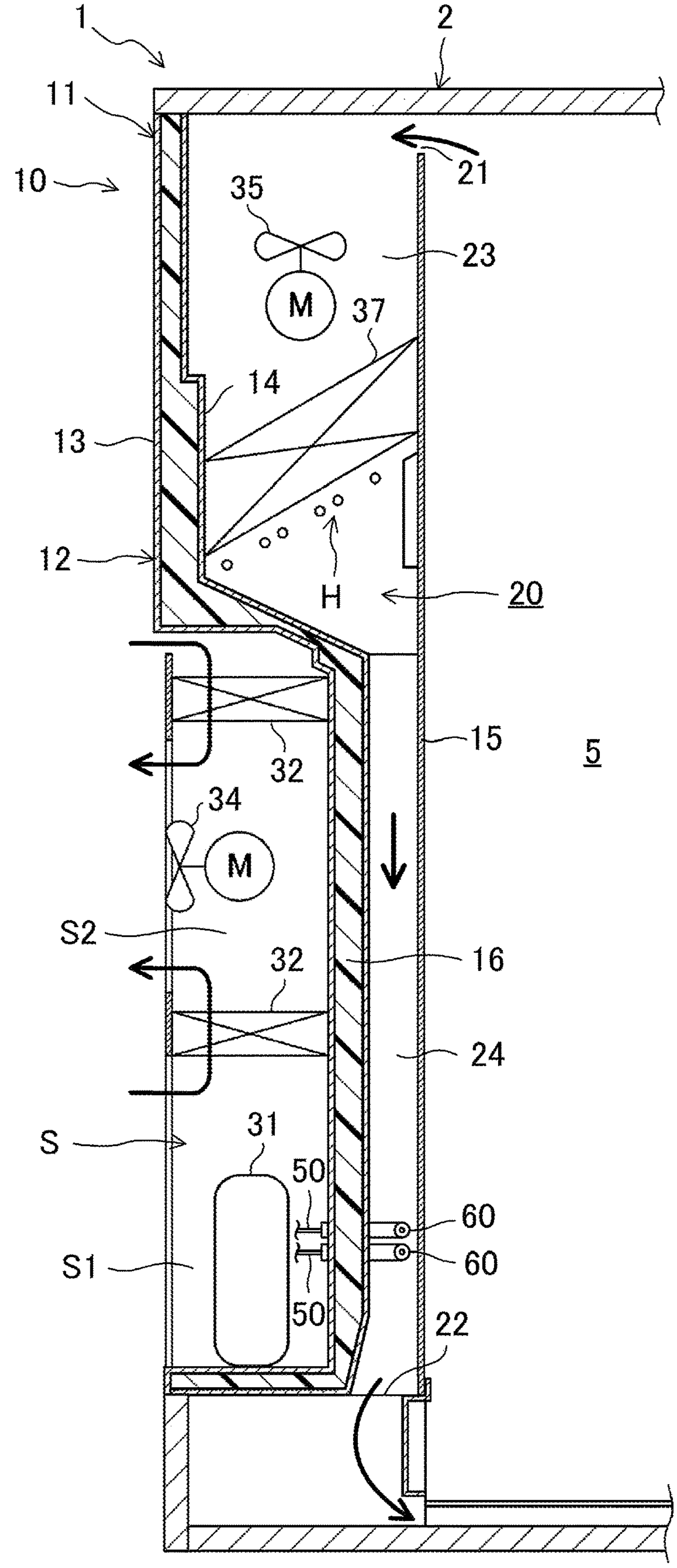
FIG. 2 is a sectional side view schematically illustrating an internal structure of the shipping container.

The present disclosure relates to a shipping container (1). As illustrated in FIGS. 1 and 2, the shipping container (1) includes a container body (2) and a refrigeration apparatus for shipping (10) provided in the container body (2). The shipping container (1) is used for marine transportation. The shipping container (1) is conveyed by a marine transporter, such as a ship.

<Container Body>

The container body (2) is formed in a hollow box-like shape. The container body (2) is formed to be horizontally long. The container body (2) has an opening formed at one end in the longitudinal direction. The refrigeration apparatus for shipping (10) blocks the opening of the container body (2). The container body (2) forms therein a storage space (5) for storing articles to be transported. An article to be transported is stored in the storage space (5). The refrigeration apparatus for shipping (10) adjusts the temperature of the air in the storage space (5) (may also be referred to as inside air).

<Refrigeration Apparatus for Shipping>

The refrigeration apparatus for shipping (10) is attached to the opening of the container body (2). The refrigeration apparatus for shipping (10) includes a casing (11) and a refrigerant circuit (C).

<Casing>

As schematically illustrated in FIG. 2, the casing (11) includes a division wall (12) and a partition plate (15). An internal flow path (20) is formed inside the division wall (12). The internal flow path (20) corresponds to an internal space. Air for cooling the articles to be transported in the storage space (5) flows through the internal flow path (20). An external chamber (S) is formed outside the division wall (12). The division wall (12) separates the internal flow path (20) from the external chamber (S).

The division wall (12) includes an exterior wall (13) and an interior wall (14). The exterior wall (13) is located outside the container body (2). The exterior wall (13) faces the outside. The interior wall (14) is located inside the container body (2). The interior wall (14) faces the internal flow path (20). The exterior wall (13) and the interior wall (14) are made of, for example, an aluminum alloy.

The exterior wall (13) closes the opening of the container body (2). The exterior wall (13) is attached to a peripheral portion of the opening of the container body (2). A lower portion of the exterior wall (13) bulges toward the inside of the container body (2). The external chamber (S) is formed inside a portion of the exterior wall (13) bulging toward the inside of the container body (2).

The interior wall (14) faces the exterior wall (13). The interior wall (14) has a shape conforming to the exterior wall (13). The interior wall (14) is spaced apart from the exterior wall (13). A lower portion of the interior wall (14) bulges toward the inside of the container body (2). A thermal insulator (16) is provided between the interior wall (14) and the exterior wall (13).

The partition plate (15) is arranged further inward of the container body (2) than the interior wall (14). The internal flow path (20) is formed between the division wall (12) and the partition plate (15). An inflow port (21) is formed between an upper end of the partition plate (15) and a top panel of the container body (2). An outflow port (22) is formed between a lower end of the partition plate (15) and a lower end of the division wall (12). The internal flow path (20) extends from the inflow port (21) to the outflow port (22).

The internal flow path (20) includes an upper flow path (23) and a lower flow path (24). The upper flow path (23) is an upper portion of the internal flow path (20). The lower flow path (24) is a lower portion of the internal flow path (20). The lower flow path (24) is located at a position corresponding to the bulging portion of the division wall (12).

<Components of Refrigerant Circuit>

The refrigerant circuit (C) is filled with a refrigerant. The refrigerant circulates in the refrigerant circuit (C) to perform a vapor compression refrigeration cycle. The refrigerant circuit (C) includes a compressor (31), an external heat exchanger (32), an expansion valve (33), an internal heat exchanger (37), and a refrigerant pipe connecting these components.

The compressor (31) is arranged in a first space (S1) corresponding to a lower portion of the external chamber (S). The compressor (31) sucks and compresses a low-pressure refrigerant. The compressor (31) discharges the compressed refrigerant as a high-pressure refrigerant.

The external heat exchanger (32) is arranged in a second space (S2) corresponding to an upper portion of the external chamber (S). The external heat exchanger (32) is a fin-and-tube heat exchanger. The external heat exchanger (32) is a so-called four-side heat exchanger. The external heat exchanger (32) has a generally rectangular outer shape in a front view. In other words, the external heat exchanger (32) has heat exchange sections on the upper side, the lower side, the right side, and the left side in a front view. The external heat exchanger (32) functions as a condenser or a radiator.

The internal heat exchanger (37) is arranged in the internal flow path (20). The internal heat exchanger (37) is supported between the division wall (12) and the partition plate (15). The internal heat exchanger (37) is arranged above the bulging portion of the interior wall (14). The internal heat exchanger (37) is a fin-and-tube heat exchanger. The internal heat exchanger (37) functions as an evaporator.

<External Fan>

The refrigeration apparatus for shipping (10) includes a single external fan (34). The external fan (34) is arranged in the second space (S2) of the external chamber (S). The external fan (34) is arranged inside the four heat exchange sections of the external heat exchanger (32). The external fan (34) is a propeller fan.

When the external fan (34) operates, the outside air flows from the outside to the inside of the external heat exchanger (32). The air inside the external heat exchanger (32) is blown out of the casing (11).

<Internal Fan>

The refrigeration apparatus for shipping (10) includes two internal fans (35). The internal fans (35) are arranged in the upper flow path (23) of the internal flow path (20). The internal fans (35) are arranged above the internal heat exchanger (37). The internal fans (35) are arranged upstream of the internal heat exchanger (37) in the flow direction of the air. The internal fans (35) are propeller fans. The internal fans (35) may be reduced to one, or may be increased to three or more.

When the internal fans (35) operate, the air in the storage space (5) flows into the upper flow path (23) of the internal flow path (20) through the inflow port (21). The air in the upper flow path (23) of the internal flow path (20) passes through the internal heat exchanger (37) and a heater (H), and flows through the lower flow path (24). The air in the lower flow path (24) flows into the storage space (5) through the outflow port (22).

<Heater>

The refrigeration apparatus for shipping (10) includes a heater (H). The heater (H) is arranged below the internal heat exchanger (37). The heater (H) is attached to a lower portion of the internal heat exchanger (37). When the heater (H) operates, the internal heat exchanger (37) is heated. The heat of the heater (H) melts frost attached to the internal heat exchanger (37). The heater (H) is used to melt the frost on the internal heat exchanger (37).

<Electric Component Box>

As illustrated in FIG. 1, the refrigeration apparatus for shipping (10) includes an electric component box (36). The electric component box (36) is arranged in the second space (S2) of the external chamber (S). The electric component box (36) houses therein components, such as a reactor, a power source circuit board, and a control board.

<Details of Refrigerant Circuit>

Figure 3:
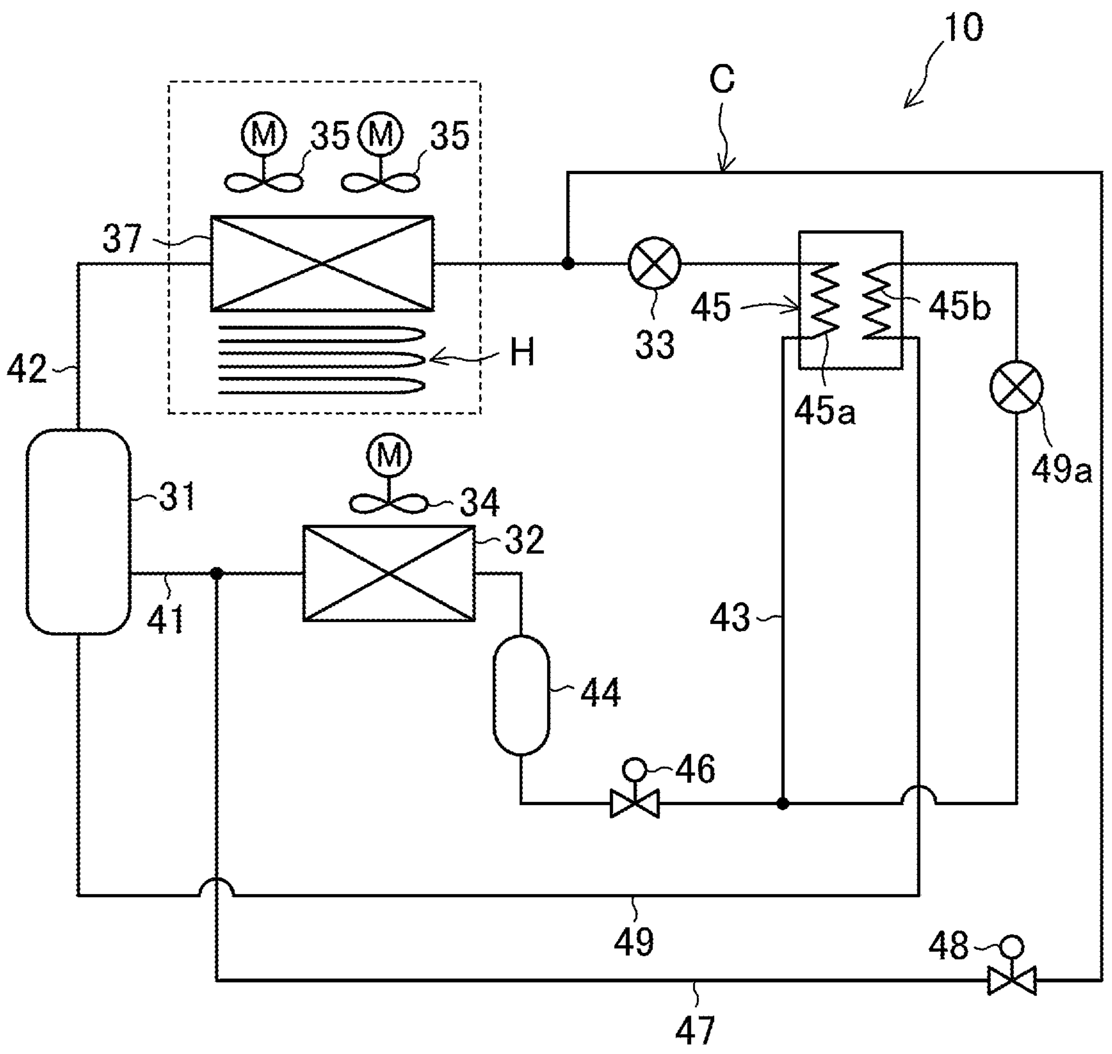
FIG. 3 is a piping system diagram of a refrigerant circuit of a refrigeration apparatus for shipping.

Details of the refrigerant circuit (C) will be described with reference to FIG. 3. In FIG. 3, components surrounded by a broken line square are internal ones, and the other components are external ones.

The refrigerant circuit (C) includes, as main components, the compressor (31), the external heat exchanger (32), the expansion valve (33), and the internal heat exchanger (37). The expansion valve (33) is an electronic expansion valve having a variable opening degree.

The refrigerant circuit (C) has a discharge pipe (41) and a suction pipe (42). One end of the discharge pipe (41) is connected to a discharge portion of the compressor (31). The other end of the discharge pipe (41) is connected to a gas end of the external heat exchanger (32). One end of the suction pipe (42) is connected to a suction portion of the compressor (31). The other end of the suction pipe (42) is connected to a gas end of the internal heat exchanger (37).

The refrigerant circuit (C) includes a liquid pipe (43), a receiver (44), a cooling heat exchanger (45), a first on-off valve (46), a connecting pipe (47), a second on-off valve (48), an injection pipe (49), and an injection valve (49*a*).

One end of the liquid pipe (43) is connected to a liquid end of the external heat exchanger (32). The other end of the liquid pipe (43) is connected to a liquid end of the internal heat exchanger (37). The receiver (44) is provided for the liquid pipe (43). The receiver (44) is a container that stores the refrigerant.

The cooling heat exchanger (45) has a first flow path (45*a*) and a second flow path (45*b*). The cooling heat exchanger (45) exchanges heat between the refrigerant in the first flow path (45*a*) and the refrigerant in the second flow path (45*b*). The cooling heat exchanger (45) is, for example, a plate heat exchanger. The first flow path (45*a*) is a portion of the liquid pipe (43). The second flow path (45*b*) is a portion of the injection pipe (49). The cooling heat exchanger (45) cools the refrigerant flowing through the liquid pipe (43).

The first on-off valve (46) is arranged in the liquid pipe (43) to be located between the receiver (44) and the first flow path (45*a*). The first on-off valve (46) is an electromagnetic valve that can be opened and closed.

The connecting pipe (47) allows a high-pressure line and a low-pressure line of the refrigerant circuit (C) to communicate with each other. One end of the connecting pipe (47) is connected to the discharge pipe (41). The other end of the connecting pipe (47) is connected to the liquid pipe (43) to be located between the expansion valve (33) and the internal heat exchanger (37).

The second on-off valve (48) is provided for the connecting pipe (47). The second on-off valve (48) is an electromagnetic valve that can be opened and closed.

The injection pipe (49) introduces the refrigerant into an intermediate-pressure portion of the compressor (31). One end of the injection pipe (49) is connected to the liquid pipe (43) to be located between the receiver (44) and the first flow path (45*a*). The other end of the injection pipe (49) is connected to the intermediate-pressure portion of the compressor (31). The intermediate pressure, which is the pressure of the intermediate-pressure portion, is a pressure in a range between the suction pressure and the discharge pressure of the compressor (31).

The injection valve (49*a*) is arranged upstream of the second flow path (45*b*) in the injection pipe (49). The injection valve (49*a*) is an electronic expansion valve having a variable opening degree.

<Operation of Refrigeration Apparatus for Shipping>

Basic operation of the refrigeration apparatus for shipping (10) will be described below. When the refrigeration apparatus for shipping (10) is in operation, the compressor (31), the external fan (34), and the internal fans (35) operate. The first on-off valve (46) opens. The second on-off valve (48) is closed. The opening degree of the expansion valve (33) is adjusted. The opening degree of the injection valve (49*a*) is adjusted.

The refrigerant compressed by the compressor (31) flows through the external heat exchanger (32). The refrigerant in the external heat exchanger (32) dissipates heat to the outside air to condense. The condensed refrigerant passes through the receiver (44). Part of the refrigerant that has passed through the receiver (44) flows through the first flow path (45*a*) of the cooling heat exchanger (45). The remaining of the refrigerant that has passed through the receiver (44) flows through the injection pipe (49), and is decompressed to the intermediate pressure by the injection valve (49*a*). The decompressed refrigerant is introduced into the intermediate-pressure portion of the compressor (31).

In the cooling heat exchanger (45), the refrigerant in the second flow path (45*b*) absorbs heat from the refrigerant in the first flow path (45*a*) to evaporate. This cools the refrigerant in the first flow path (45*a*). In other words, the degree of subcooling of the refrigerant flowing through the first flow path (45*a*) increases.

The refrigerant cooled in the cooling heat exchanger (45) is decompressed to a low pressure by the expansion valve (33). The decompressed refrigerant flows through the internal heat exchanger (37). The refrigerant in the internal heat exchanger (37) absorbs heat from the inside air to evaporate. Thus, the internal heat exchanger (37) cools the inside air. The evaporated refrigerant is sucked into the compressor (31) and compressed again.

The air in the container body (2) circulates between the storage space (5) and the internal flow path (20). The internal heat exchanger (37) cools the inside air in the internal flow path (20). Thus, the air in the storage space (5) can be cooled and adjusted to a predetermined temperature.

<Temperature Sensor>

As illustrated in FIGS. 1 and 2, a temperature sensor (50) is attached to the casing (11). The temperature sensor (50) detects the temperature of the internal flow path (20).

Figure 4:
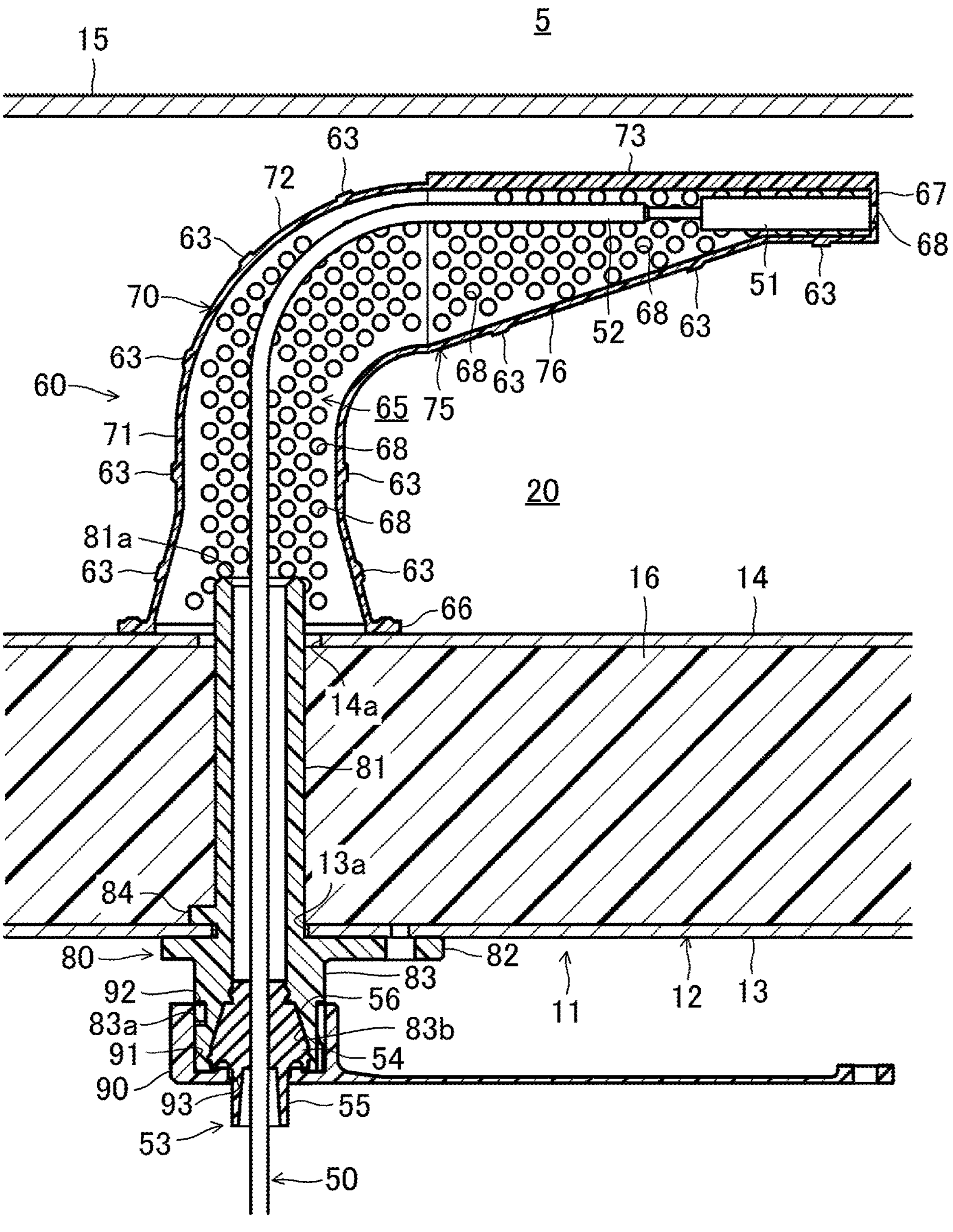
FIG. 4 is a lateral cross-sectional view illustrating the configuration of a temperature sensor, a guide member, and a holder.
Figure 5:
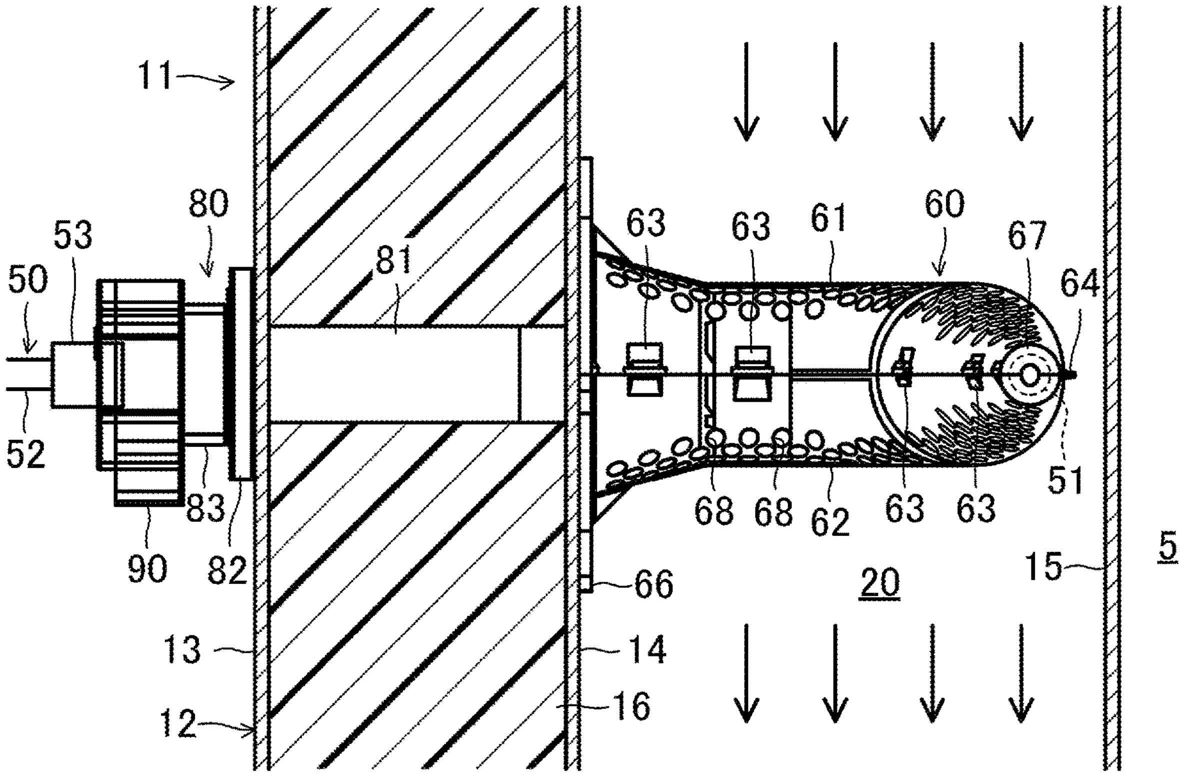
FIG. 5 is a sectional side view illustrating the configuration of the temperature sensor, the guide member, and the holder.
Figure 6:
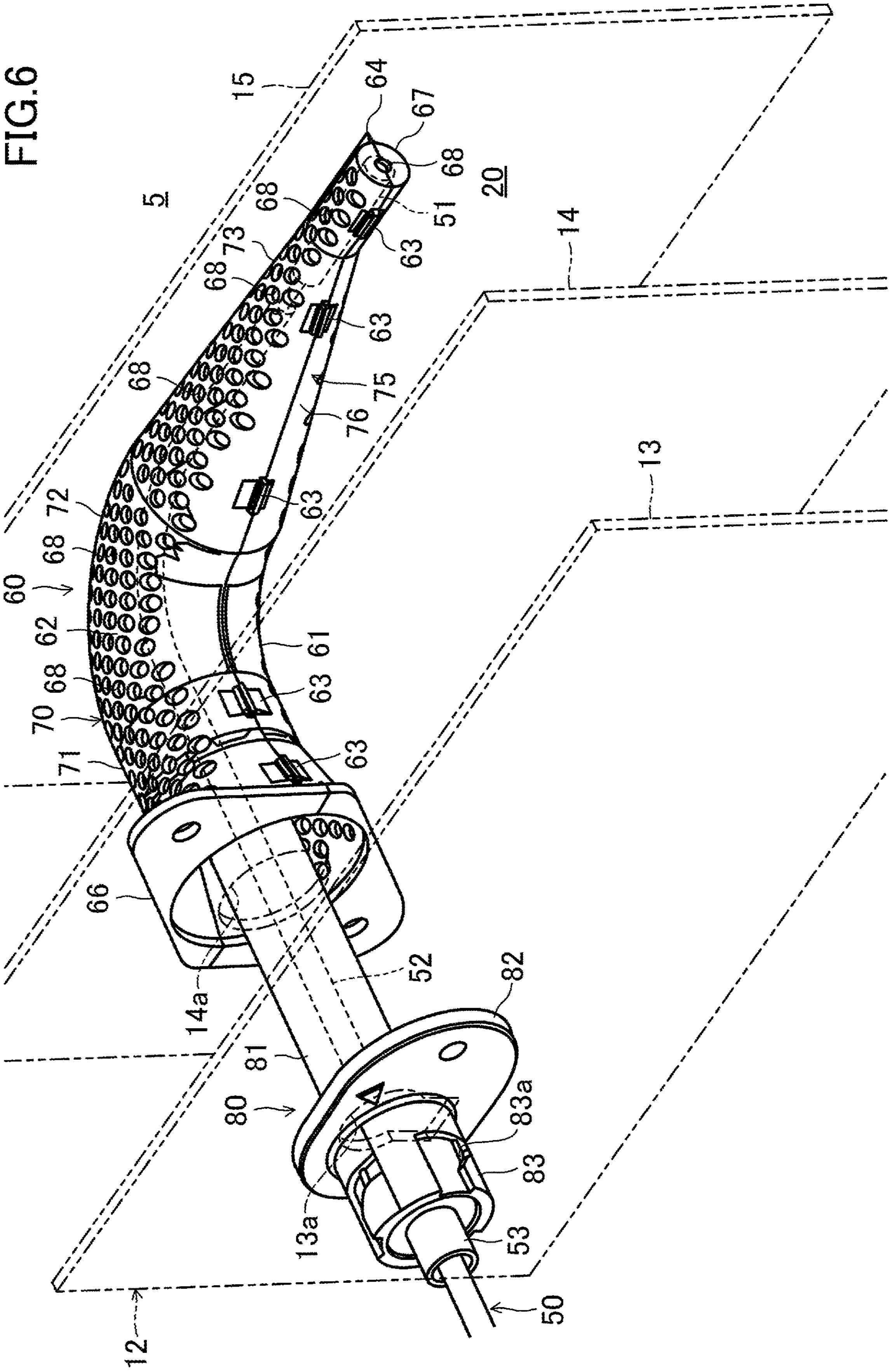
FIG. 6 is a perspective view illustrating the configuration of the temperature sensor, the guide member, and the holder.

As illustrated in FIGS. 4 to 6, the casing (11) has an opening that allows the internal flow path (20) to communicate with the outside. The opening includes a hole (13*a*) formed in the exterior wall (13) and a hole (14*a*) formed in the interior wall (14).

The temperature sensor (50) has a detector (51) and a lead wire (52). The detector (51) detects the temperature of the internal flow path (20). Specifically, the detector (51) detects the temperature of the inside air cooled by the internal heat exchanger (37). The lead wire (52) is connected to the detector (51). The lead wire (52) is made of a conductive wire material. The lead wire (52) is covered with an insulative coating. The lead wire (52) is flexible. The lead wire (52) is provided with an elastic member (53).

The elastic member (53) is made of a rubber material. The elastic member (53) has a large diameter portion (54) and a small diameter portion (55). The large diameter portion (54) has a larger outer diameter than the small diameter portion (55). The large diameter portion (54) is located closer to the detector (51) than the small diameter portion (55). The large diameter portion (54) has a tapered portion (56) that is tapered toward the detector (51). The large diameter portion (54) and the small diameter portion (55) have holes through which the lead wire (52) is inserted.

A holder (80) (a first passage member) is fixed to the exterior wall (13). The holder (80) communicates with the hole (13*a*) of the exterior wall (13). A guide member (60) (a second passage member, a cover member) is fixed to the interior wall (14). The guide member (60) communicates with the hole (14*a*) of the interior wall (14).

When inserted in the holder (80), the temperature sensor (50) is guided to a specific location in the internal flow path (20) by the guide member (60). The detector (51) and the lead wire (52) are held by the guide member (60).

<Guide Member>

The guide member (60) is arranged in the internal flow path (20). The guide member (60) is made of a resin material. The guide member (60) includes a first member (61), a second member (62), and coupling portions (63).

Figure 7:
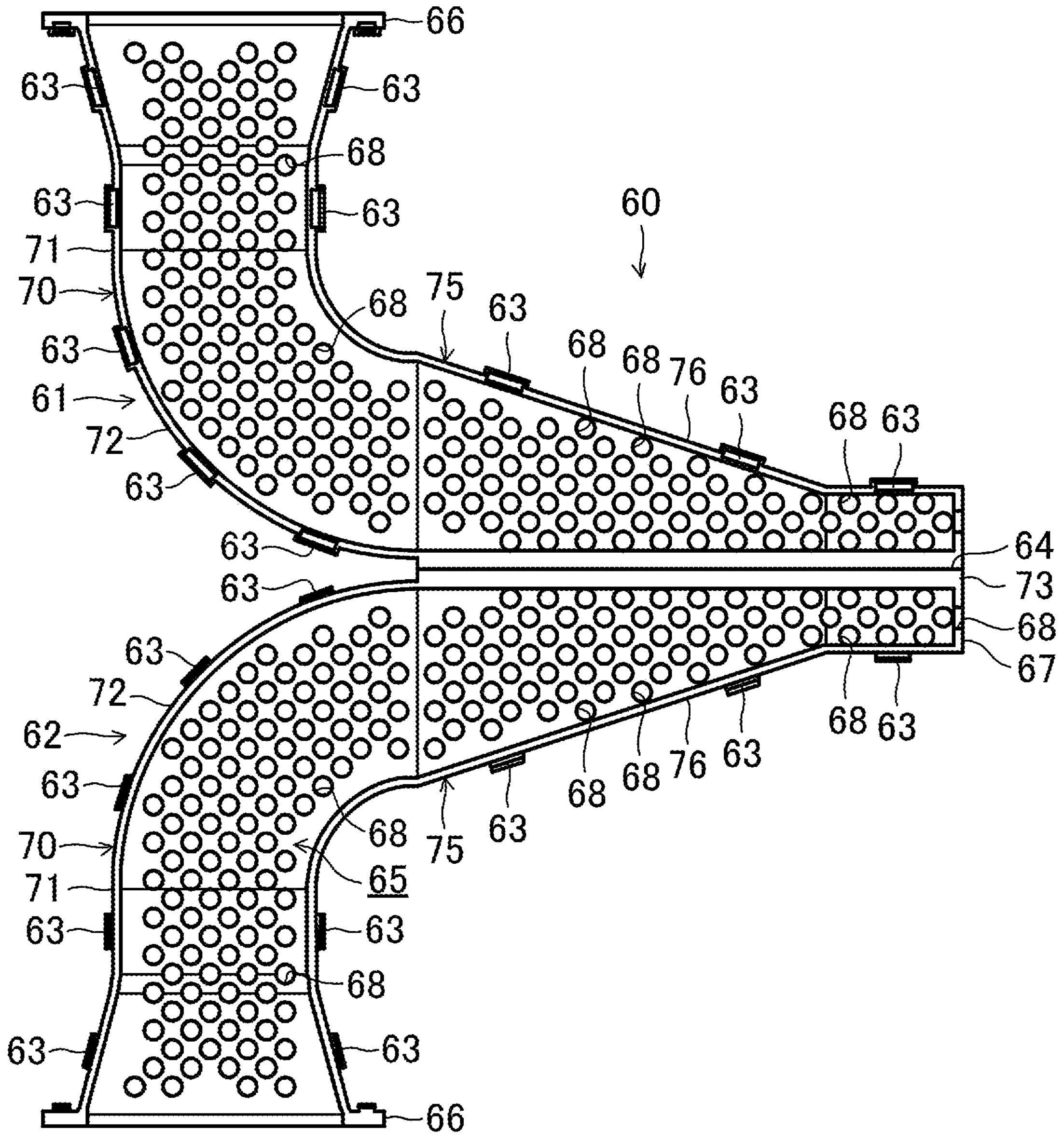
FIG. 7 is a plan view illustrating an open cover member.

As also illustrated in FIG. 7, the first member (61) and the second member (62) are formed into one piece with a fold

(64) interposed therebetween. The first member (61), the second member (62), the coupling portions (63), and the fold (64) are formed into one piece by resin molding.

The guide member (60) is formed by resin molding into a shape with the first member (61) and the second member (62) kept open, i.e., in a state before the guide member (60) is bent along the fold (64). Thus, the first member (61), the second member (62), the coupling portions (63), and the fold (64) formed into one piece can be obtained by merely releasing a resin-molding die in one direction. In the resin molding process, a plurality of holes (68) are formed in the first member (61) and the second member (62).

With the guide member (60) bent along the fold (64), the coupling portions (63) connect the first member (61) and the second member (62). Each coupling portion (63) includes, for example, a hole formed in the first member (61) and a claw provided for the second member (62) to engage with the hole.

An interior space (65) is formed between the first member (61) and the second member (62). The temperature sensor (50) is arranged in the interior space (65). The guide member (60) extends from the interior wall (14) toward the partition plate (15), and then extends along the partition plate (15). For example, the guide member (60) extends to the right in FIG. 4. The guide member (60) extends substantially horizontally.

A flange (66) is provided at a proximal end of the guide member (60). The flange (66) is fixed to the interior wall (14). A distal end wall (67) is provided at a distal end of the guide member (60). A distal end of the detector (51) of the temperature sensor (50) comes into contact with the distal end wall (67). A hole (68) is formed in the distal end wall (67).

The guide member (60) constitutes a cover that covers the temperature sensor (50). The guide member (60) is provided with a plurality of holes (68). The holes (68) have an inner diameter less than or equal to 3 mm. The plurality of holes (68) are arranged in a zigzag pattern. Specifically, the holes (68) are arranged in a plurality of rows, and the holes (68) of one of the rows are offset from the holes (68) of an adjacent row by half a pitch. This arrangement can increase the number of holes (68) formed in the guide member (60), improving ventilation to the temperature sensor (50).

The air flows around the guide member (60) in a predetermined flow direction. In the example shown in FIG. 5, the air flows from the top to bottom of the internal flow path (20). The plurality of holes (68) are formed along the flow direction of the air. The plurality of holes (68) are open on the upper and lower surfaces of the guide member (60). This allows the air to easily flow through the holes (68) of the guide member (60), improving the ventilation to the temperature sensor (50).

Figure 8:
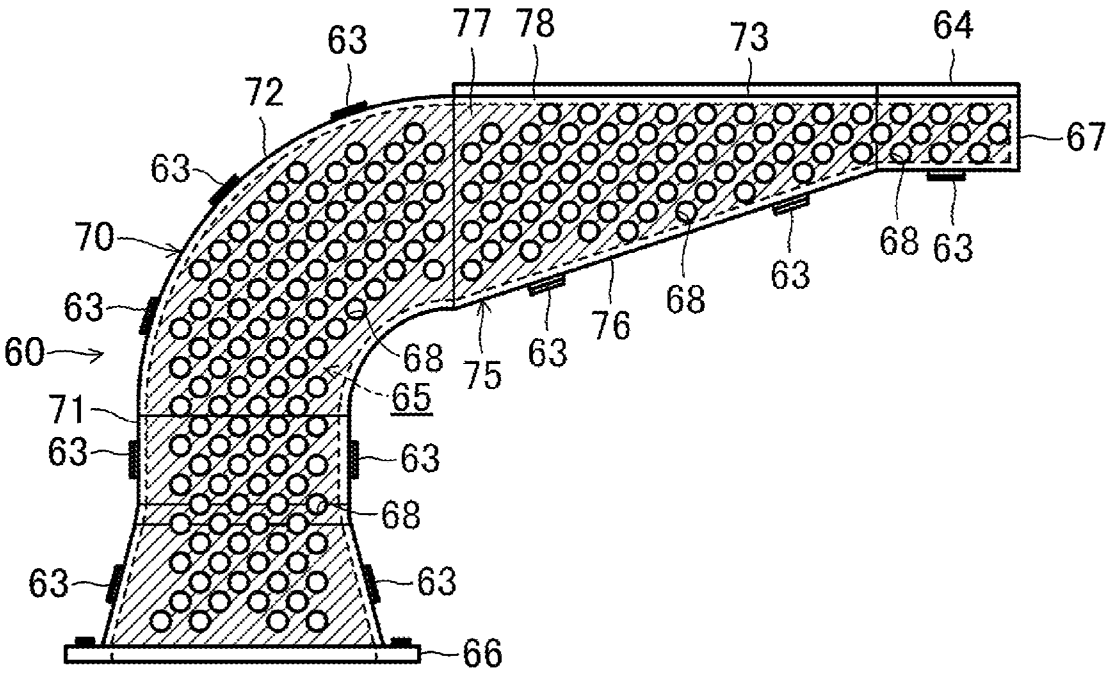
FIG. 8 is a plan view illustrating a first cover portion and a second cover portion.

Specifically, as illustrated in FIG. 8, the guide member (60) includes a first cover portion (77) and a second cover portion (78) when viewed in the flow direction of the air. The first cover portion (77) overlaps the interior space (65) when viewed in the flow direction of the air. In FIG. 8, the first cover portion (77) is hatched.

The plurality of holes (68) are formed in the first cover portion (77). Thus, the holes (68) formed in the first cover portion (77), which is a surface of the guide member (60) through which the air passes, can improve the ventilation to the temperature sensor (50).

The second cover portion (78) does not overlap the interior space (65) when viewed in the flow direction of the air. No holes (68) are formed in the second cover portion (78). With no holes (68) formed in the second cover portion (78), which is a surface irrelevant to the ventilation of the guide member (60), the guide member (60) can be kept rigid.

When the guide member (60) is formed into one piece by resin molding, it is difficult to form the holes (68) in some portions due to the configuration of the resin-molding die. When such a portion in which the holes (68) are difficult to form is made into the second cover portion (78) irrelevant to the ventilation, the guide member (60) that gives good ventilation to the temperature sensor (50) can be easily formed.

The guide member (60) is fixed to the interior wall (14) so that the fold (64) does not overlap the interior space (65) when viewed from the flow direction of the air. In other words, the fold (64) is present in the second cover portion (78).

As illustrated in FIG. 4, the guide member (60) includes a first guide portion (71), a curved portion (72), and a second guide portion (73) that is a linear portion. The first guide portion (71) extends from the interior wall (14) toward the partition plate (15). The curved portion (72) extends continuously from the first guide portion (71). The first guide portion (71) extends substantially horizontally. The curved portion (72) is formed in a curved shape in plan view. The curved portion (72) extends substantially horizontally.

The second guide portion (73) extends linearly and continuously from the curved portion (72). The second guide portion (73) extends in a direction at a right angle relative to the first guide portion (71) in plan view. The second guide portion (73) extends along the partition plate (15). The second guide portion (73) extends substantially horizontally.

This configuration allows the temperature sensor (50) to be smoothly inserted along the first guide portion (71) and the second guide portion (73). The second guide portion (73) may extend in a direction at an obtuse angle relative to the first guide portion (71) in plan view.

The curved portion (72) is provided with a plurality of coupling portions (63) (three coupling portions in the example shown in FIG. 8). Even if the temperature sensor (50) inserted from the outside presses the curved portion (72), the coupling portions (63) can keep the guide member (60) from opening accidentally.

The second guide portion (73) is provided with the fold (64). When the fold (64) is provided in the second guide portion (73), which is a surface of the guide member (60) irrelevant to the ventilation, no holes (68) are required in the fold (64), maintaining the rigidity.

When the temperature sensor (50) is inserted into the holder (80), the direction of insertion of the detector (51) changes along the curved portion (72). Thus, the temperature sensor (50) can be arranged at a specific location in the internal flow path (20) while keeping a distance that can reduce conduction of heat from the outside.

The guide member (60) has a first wall (70) and a second wall (75) in plan view. For example, in the cross section taken along the temperature sensor (50) shown in FIG. 4, a portion of the wall forming the contour of the guide member (60) and facing the partition plate (15) will be referred to as the first wall (70), and a portion facing the interior wall (14) as the second wall (75).

The first wall (70) includes the first guide portion (71), the curved portion (72), and the second guide portion (73).

The second wall (75) faces the first wall (70). The second wall (75) has an inclined portion (76). The inclined portion (76) is located closer to the distal end than the curved portion (72) of the first wall (70). The inclined portion (76) is inclined to approach the first wall (70) in plan view. Thus, the detector (51) can be easily guided toward the distal end of the guide member (60) when inserting the temperature sensor (50).

The detector (51) is held substantially horizontally at the distal end of the guide member (60) (see FIG. 5). This can keep water from accumulating at the junction between the detector (51) and the lead wire (52) of the temperature sensor (50).

<Holder>

The holder (80) allows the internal flow path (20) to communicate with the outside. The holder (80) guides the temperature sensor (50) to the guide member (60). The holder (80) includes a holder body (81) (a passage body), a flange (82), and a fixing portion (83).

The holder body (81) is formed in a tubular shape. The holder body (81) is inserted in a hole (13*a*) of the exterior wall (13) and a hole (14*a*) of the interior wall (14). A distal end portion of the holder body (81) penetrates into the internal flow path (20). The holder body (81) is formed as a member separate from the guide member (60). The holder body (81) and the guide member (60) are arranged apart from each other. The distal end portion of the holder body (81) is in the guide member (60). The holder (80) and the guide member (60) may be formed into one piece.

An inner peripheral edge of the end of the holder body (81) closer to the internal flow path (20) is formed into a tapered portion (81*a*). The tapered portion (81*a*) has a diameter increasing toward the internal flow path (20). This can keep the detector (51) and the lead wire (52) from being caught by the end of the holder (80) when the temperature sensor (50) is pulled out of the internal flow path (20).

The flange (82) projects radially outward from the holder body (81). The flange (82) is in contact with the outer surface of the exterior wall (13). The flange (82) is fixed to the exterior wall (13).

The holder body (81) has a protrusion (84). The protrusion (84) protrudes from the outer peripheral surface of the holder body (81). The protrusion (84) is in contact with the inner surface of the exterior wall (13).

Figure 9:
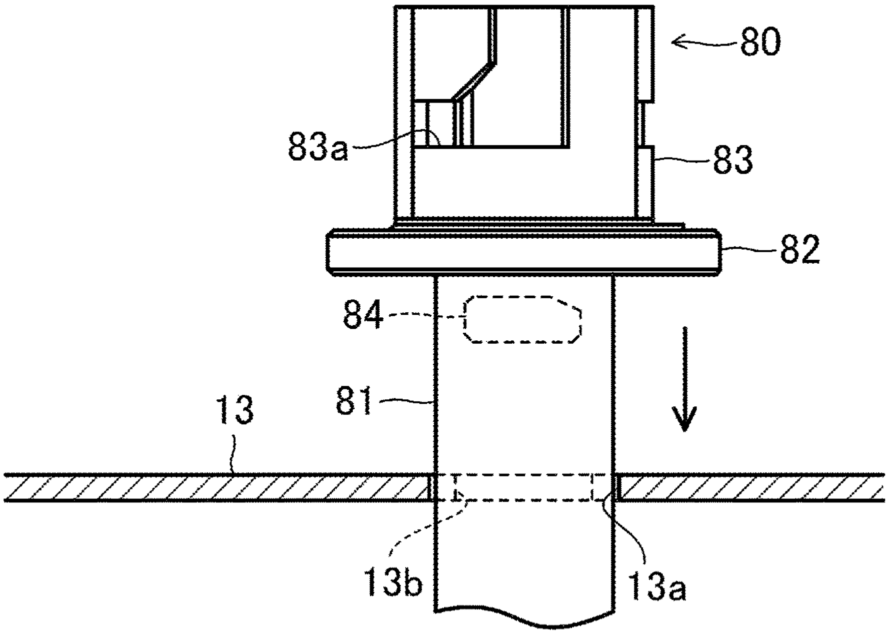
FIG. 9 is a lateral cross-sectional view illustrating the holder that is not fixed yet to an exterior wall.
Figure 10:
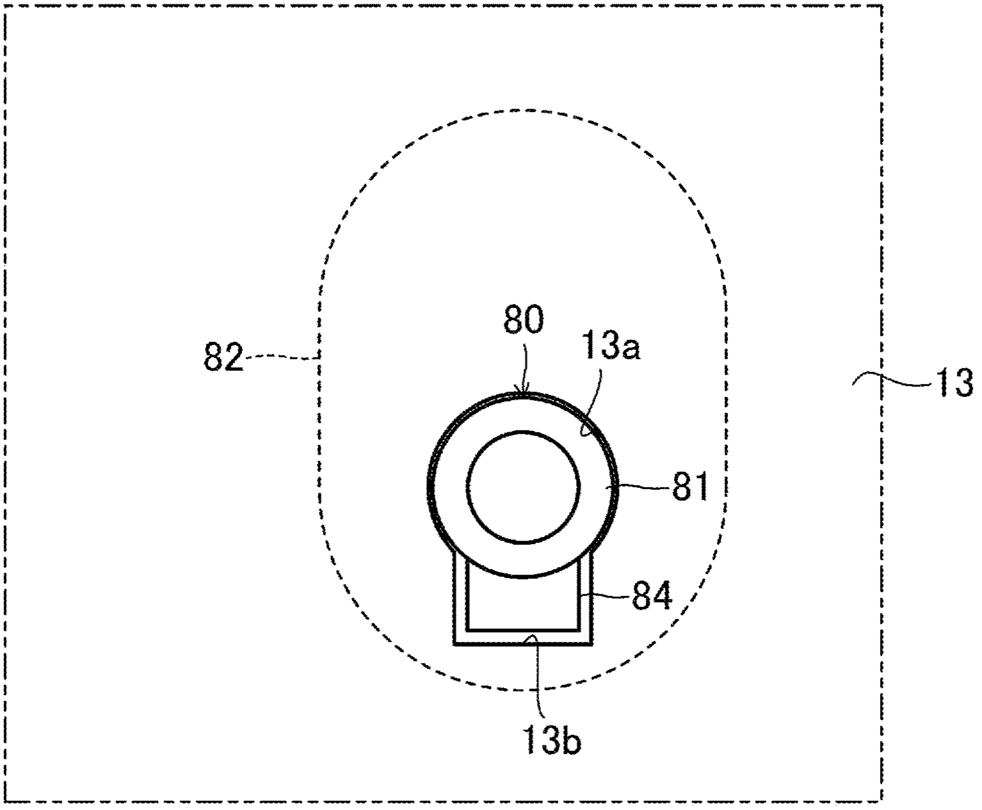
FIG. 10 is a view illustrating the holder that is not fixed yet to the exterior wall as viewed from the inside.

As illustrated in FIGS. 9 and 10, the hole (13*a*) of the exterior wall (13) has a key groove (13*b*). The key groove (13*b*) is formed into a size that the protrusion (84) is able to pass through.

The holder (80) is configured to be switchable between a first position and a second position. In the first position, the protrusion (84) can pass through the hole (13*a*) of the exterior wall (13) (see FIG. 10). When the holder body (81) is inserted into the hole (13*a*) with the holder (80) kept in the first position, the protrusion (84) passes through the key groove (13*b*).

Figure 11:
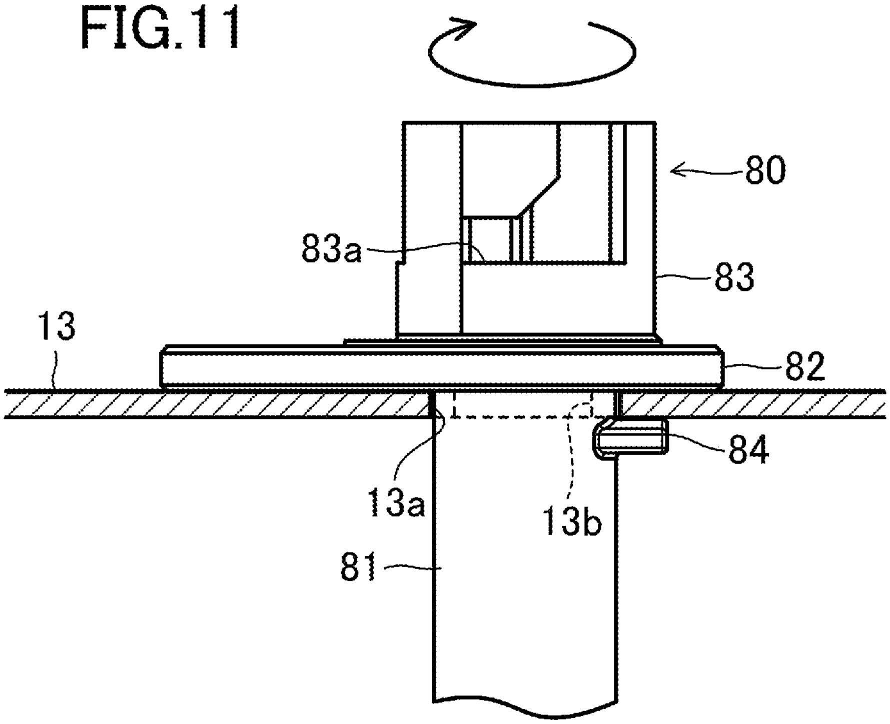
FIG. 11 is a lateral cross-sectional view illustrating the holder fixed to the exterior wall.
Figure 12:
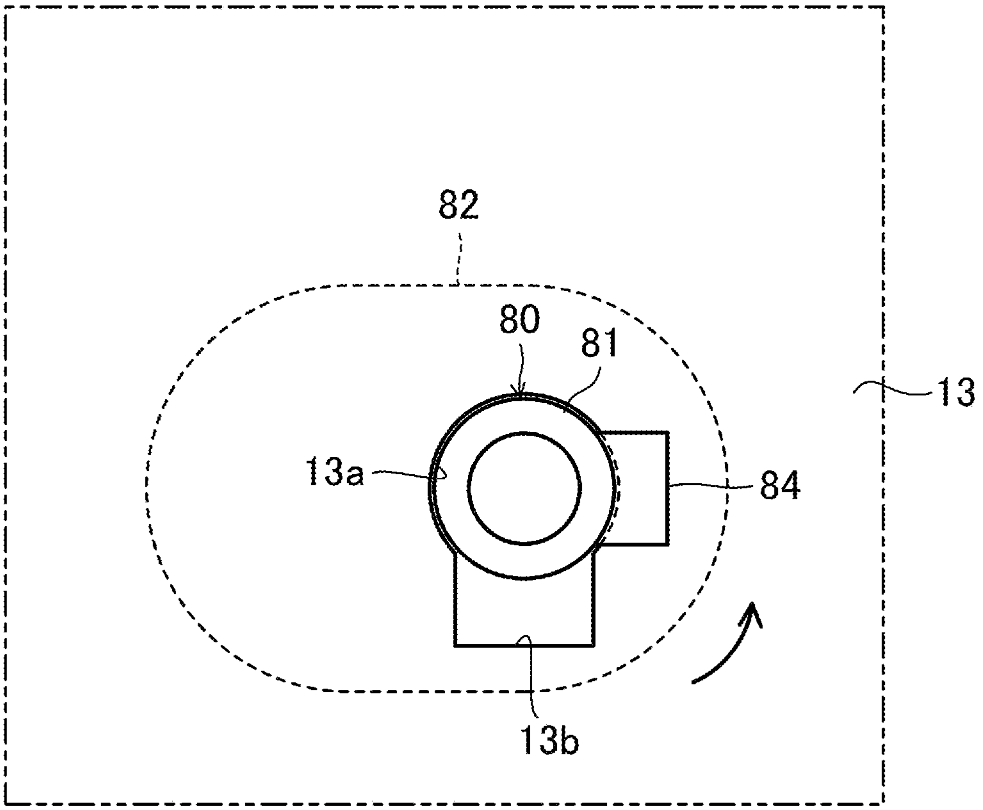
FIG. 12 is a view illustrating the holder fixed to the exterior wall as viewed from the inside.

The holder (80) is inserted to the inside until the flange (82) comes into contact with the exterior wall (13). As illustrated in FIGS. 11 and 12, the holder (80) at the first position is changed to the second position when the holder body (81) is rotated. At the second position, the protrusion (84) engages with the surface of the exterior wall (13) facing the internal flow path (20) (see FIG. 12). At the second position, the holder (80) cannot be detached from the hole (13*a*).

Thus, rotating the holder (80) allows easy assembly of the holder (80) and the exterior wall (13). The change from the first position to the second position may be achieved by not only the rotational movement, but a parallel movement or a combination of the rotational movement and the parallel movement.

The fixing portion (83) extends outward beyond the flange (82). The fixing portion (83) has a fixing groove (83*a*) and a tapered hole (83*b*). The fixing groove (83*a*) is formed in an outer peripheral surface of the fixing portion (83). A fixing claw (92) of a lock member (90) fits into the fixing groove (83*a*).

The tapered hole (83*b*) communicates with the hole of the holder body (81). The tapered hole (83*b*) is tapered from the outside toward the internal flow path (20). The elastic member (53) is arranged inside the tapered hole (83*b*). The tapered portion (56) of the elastic member (53) abuts on an inner wall of the tapered hole (83*b*).

This can keep the elastic member (53) and the holder (80) airtight. The temperature sensor (50) is inserted until the elastic member (53) is fixed to the holder (80). This can keep the degree of insertion of the temperature sensor (50) from varying.

The elastic member (53) is fixed to the holder (80) when sandwiched between the holder (80) and the lock member (90). The temperature sensor (50) is fixed to the holder (80) via the elastic member (53).

The lock member (90) has a recess (91) to be fitted with the fixing portion (83) of the holder (80). The fixing claw (92) is provided on an inner peripheral surface of the recess (91). The lock member (90) is fixed to the holder (80) when the fixing claw (92) engages with the fixing groove (83*a*) of the fixing portion (83).

Figure 13:
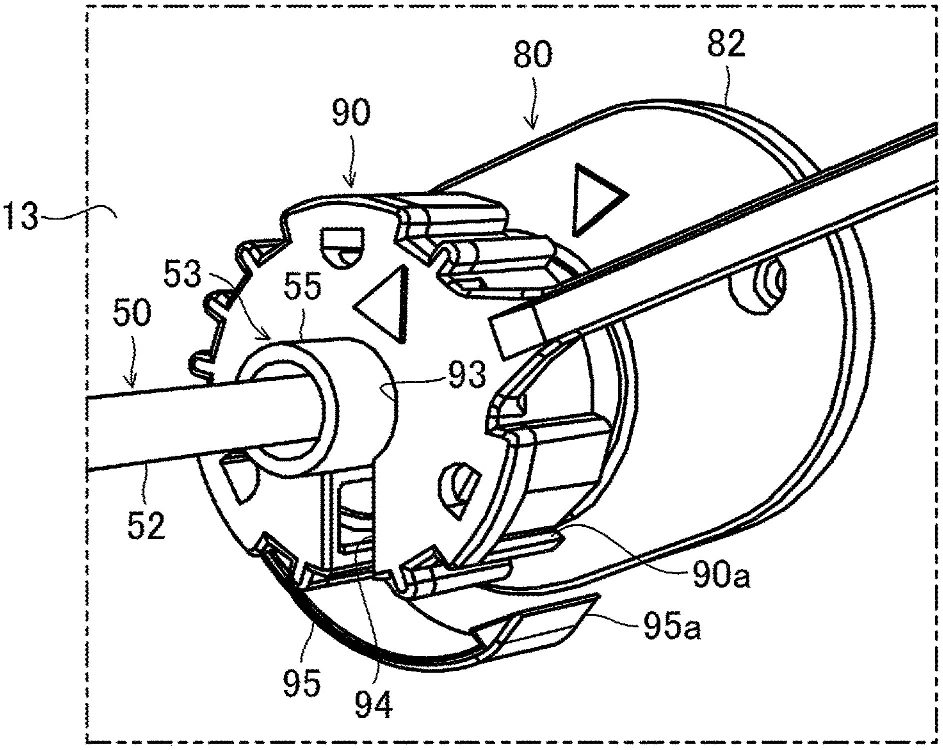
FIG. 13 is a perspective view illustrating the configuration of a lock member.

As illustrated in FIG. 13, the lock member (90) has an insertion hole (93) and a slit (94). The insertion hole (93) penetrates the bottom of the recess (91). The lead wire (52) and the small diameter portion (55) of the elastic member (53) are inserted into the insertion hole (93). The slit (94) opens in the radial direction. The slit (94) communicates with the insertion hole (93). The slit (94) has a width that the lead wire (52) can pass through.

The lock member (90) includes a restriction portion (95). The restriction portion (95) extends in the circumferential direction along the outer peripheral surface of the lock member (90). The restriction portion (95) switches the opening of the slit (94) between an open state and a closed state. An engagement claw (95*a*) is provided at a distal end of the restriction portion (95). An engagement groove (90*a*) is formed in the outer peripheral surface of the lock member (90).

As illustrated in FIG. 13, when the restriction portion (95) is open, the opening of the slit (94) is open. This configuration allows the lock member (90) to be attached to and detached from the lead wire (52) of the temperature sensor (50) through the slit (94).

Figure 14:
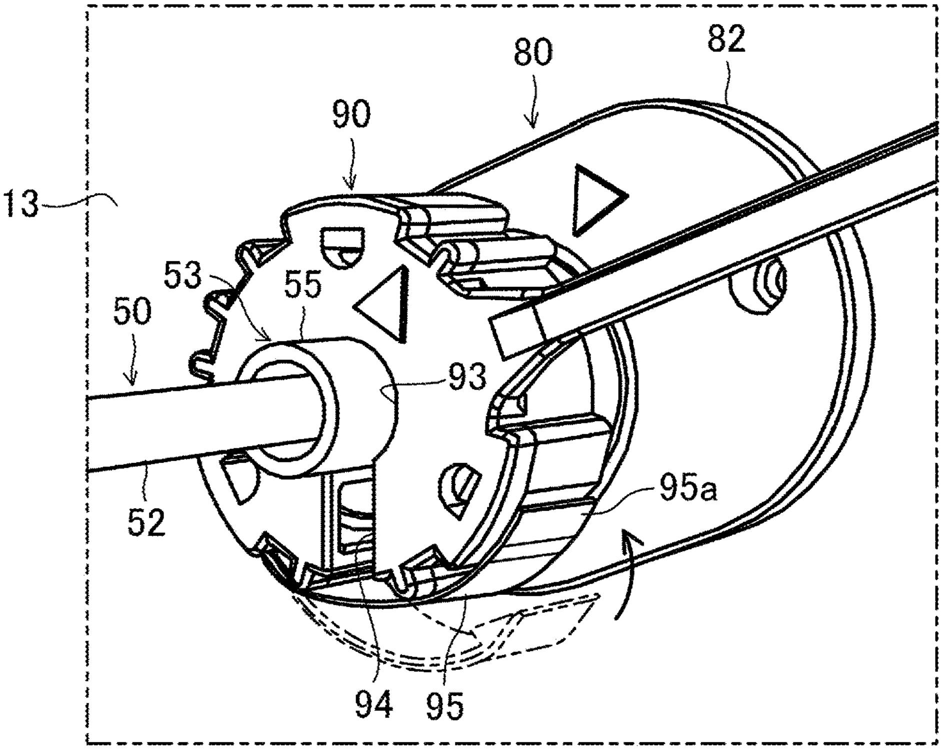
FIG. 14 is a perspective view illustrating the configuration of the lock member with a slit closed.

As illustrated in FIG. 14, when the restriction portion (95) is closed, the opening of the slit (94) is closed. At this time, the engagement claw (95*a*) engages with the engagement groove (90*a*). The restriction portion (95) restricts an increase in the opening width of the slit (94).

Thus, when the lock member (90) is rotated to be fixed to the holder (80), a repulsive force of the elastic member (53) can keep the slit (94) from opening accidentally.

<Process of Placing Temperature Sensor in Internal Flow Path>

Figure 15:
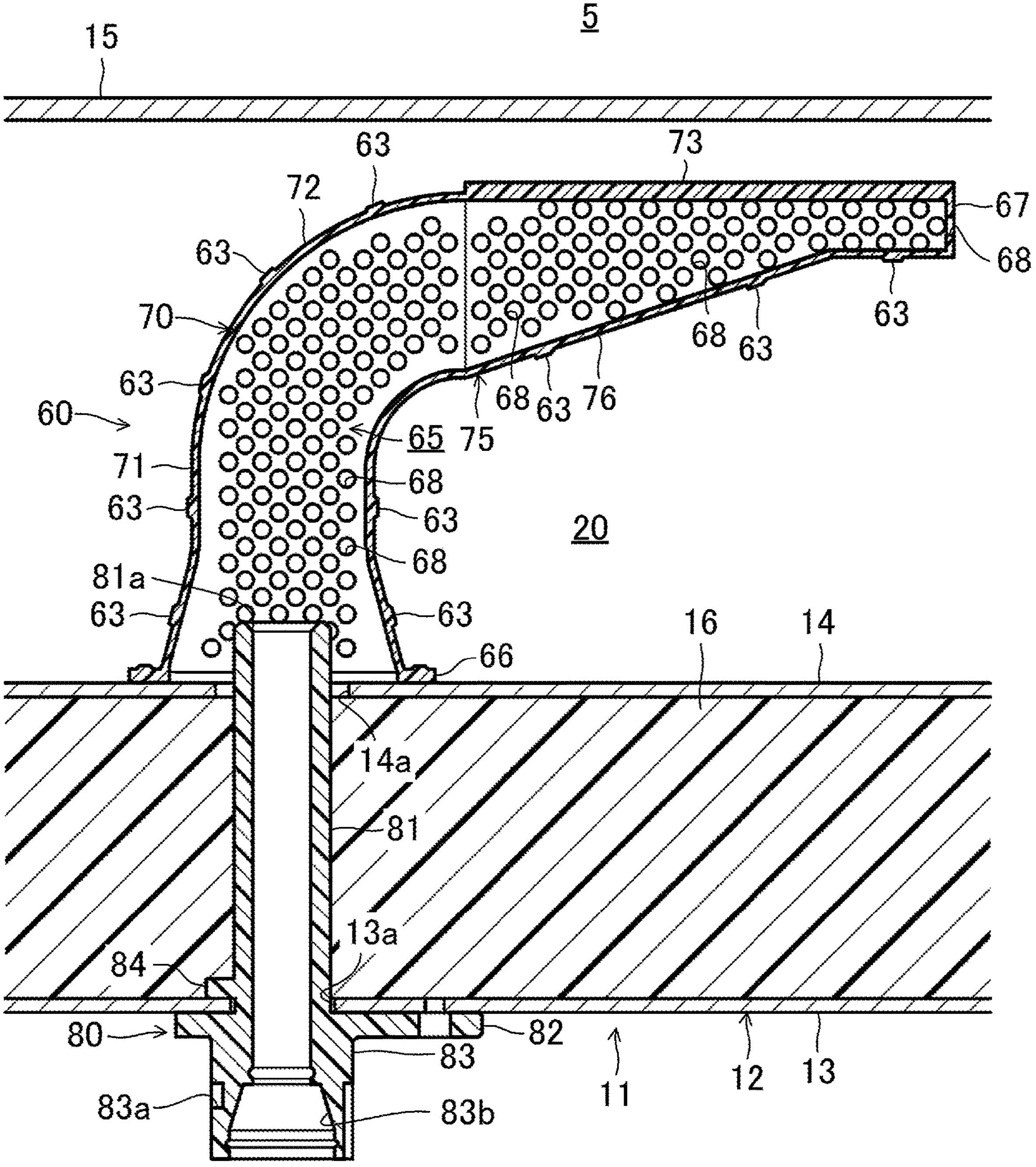
FIG. 15 is a lateral cross-sectional view illustrating the temperature sensor not inserted yet into the guide member and the holder.

A process of how an operator places the temperature sensor (50) in the internal flow path (20) from the outside will be described below. As illustrated in FIG. 15, the holder (80) is fixed to the exterior wall (13), and the guide member (60) is fixed to the interior wall (14). The temperature sensor (50) is not arranged in the holder (80) and the guide member (60).

Figure 16:
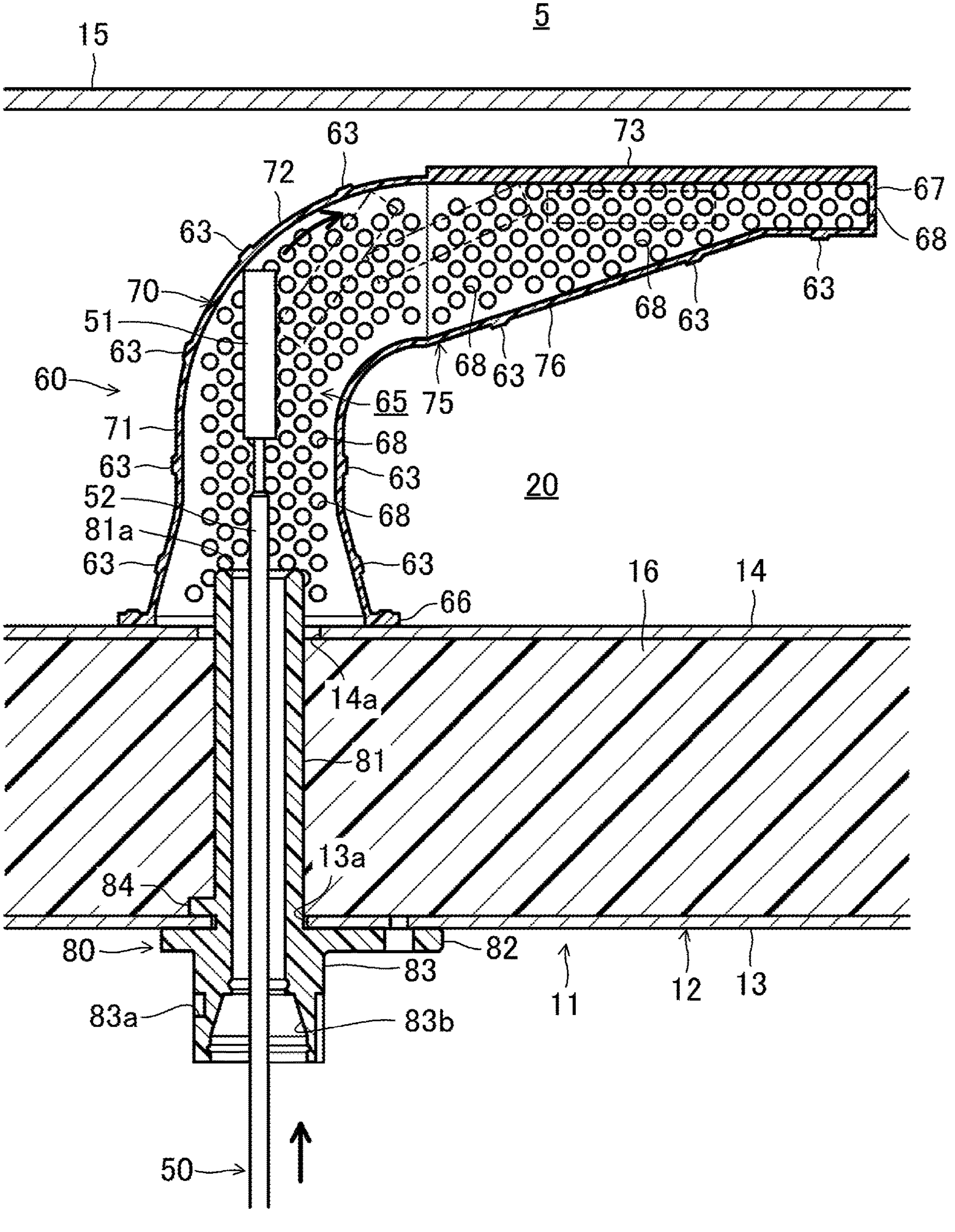
FIG. 16 is a lateral cross-sectional view illustrating the temperature sensor being inserted into the guide member and the holder.

As illustrated in FIG. 16, when the operator inserts the temperature sensor (50) from the outside into the holder (80), the detector (51) comes into contact with the curved portion (72) of the guide member (60). When the temperature sensor (50) is further inserted in this state, the distal end of the detector (51) moves along the curved portion (72) as indicated by an imaginary line in FIG. 16. This changes the insertion direction of the detector (51).

Figure 17:
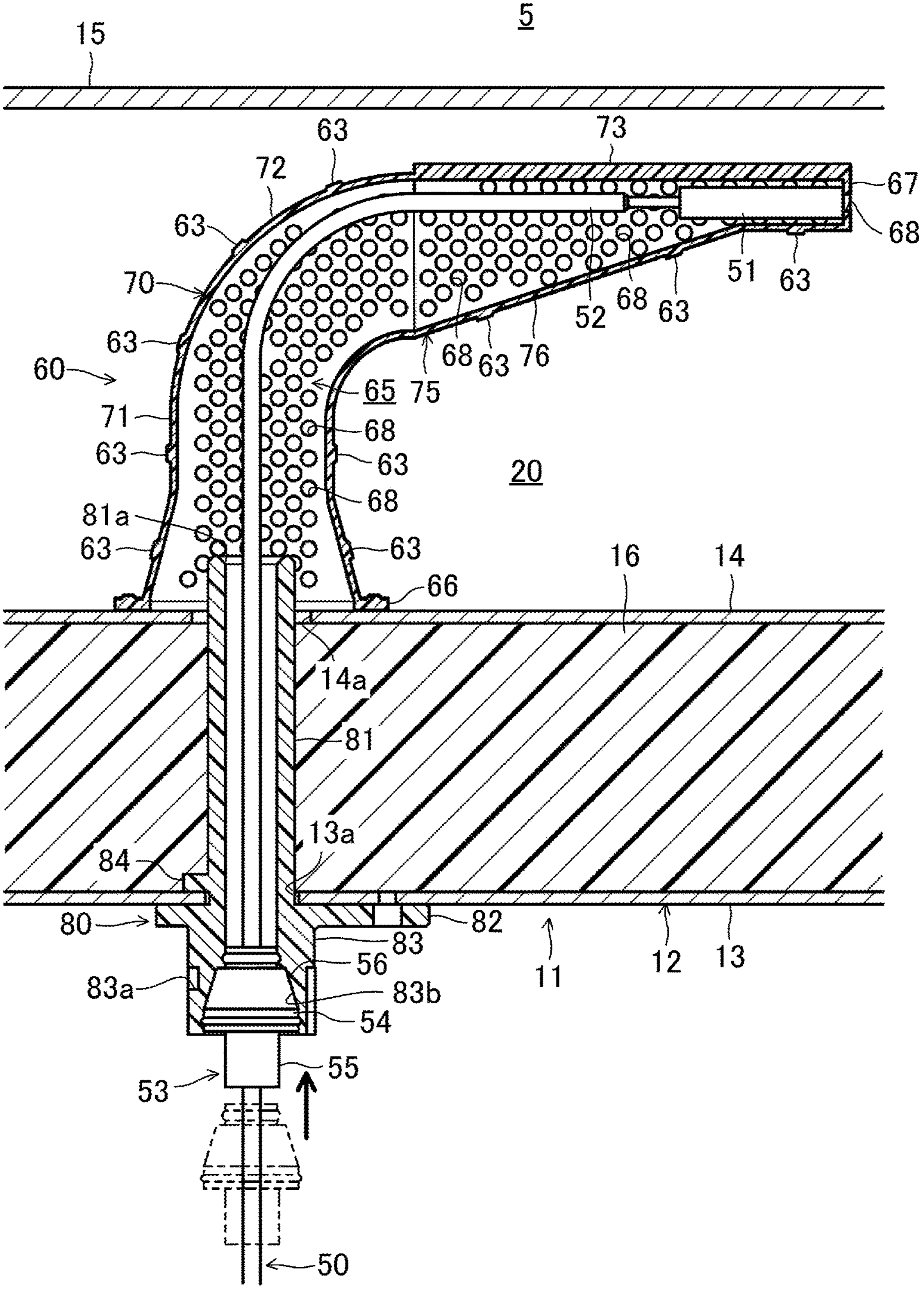
FIG. 17 is a lateral cross-sectional view illustrating a state in which an elastic member is put into the holder to position the temperature sensor.

As illustrated in FIG. 17, when the operator inserts the temperature sensor (50) further inward, the elastic member (53) provided on the lead wire (52) enters the holder (80). At this time, the tapered portion (56) of the elastic member (53) comes into contact with the inner wall of the tapered hole (83*b*) of the holder (80), determining the position of the detector (51) in the guide member (60).

In the example shown in FIG. 17, the position of the elastic member (53) on the lead wire (52) is determined so that the distal end of the detector (51) abuts on the distal end wall (67) of the guide member (60). This configuration allows the temperature sensor (50) to be arranged at a specific location in the internal flow path (20) while keeping a distance that can reduce conduction of heat from the outside.

Figure 18:
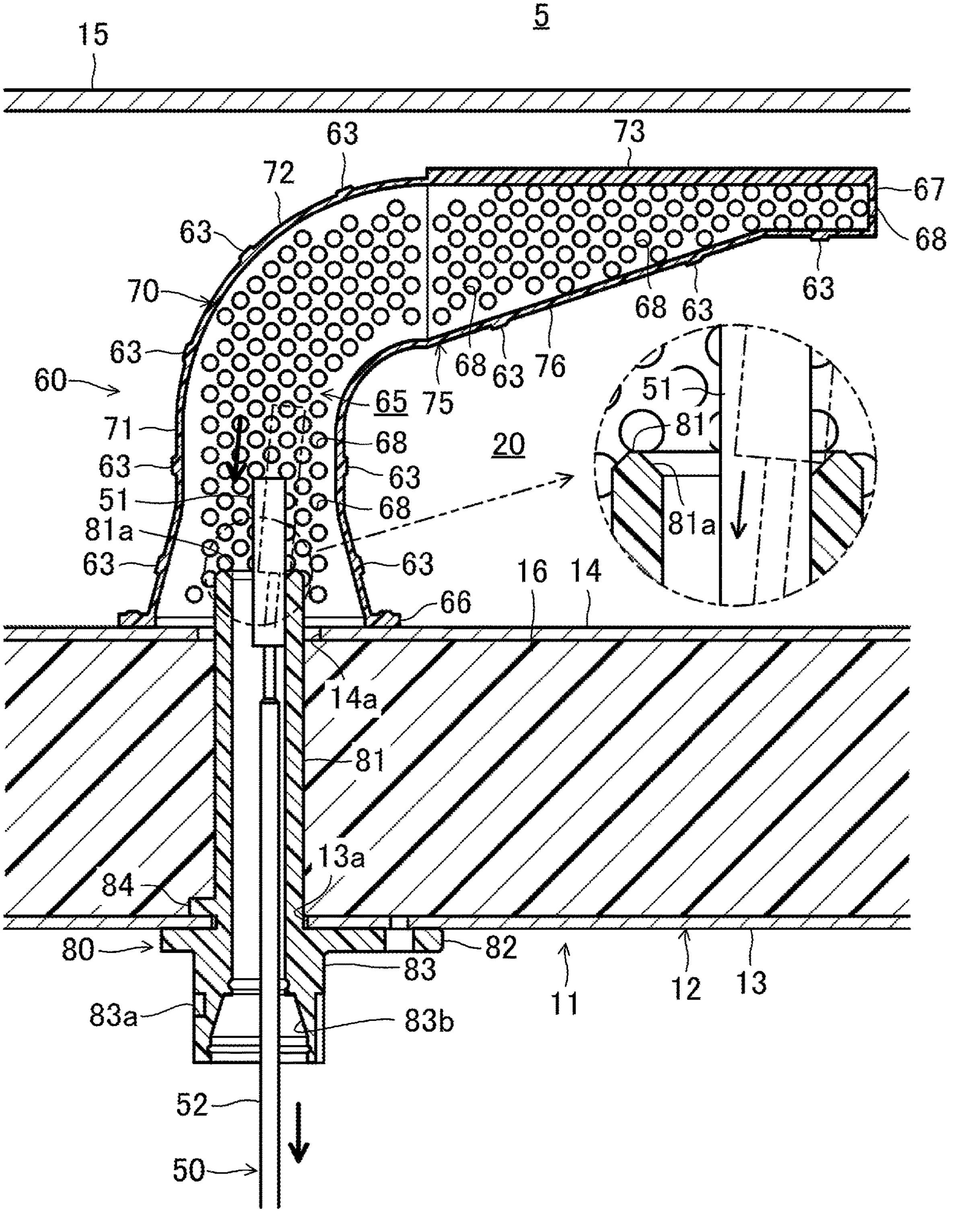
FIG. 18 is a lateral cross-sectional view illustrating the temperature sensor being pulled out of the guide member and the holder.

FIG. 18 shows a state in which the temperature sensor (50) in the guide member (60) is being pulled out of the holder (80) by the operator. The holder (80) has the tapered portion (81*a*) at the inner peripheral edge of the end closer to the internal flow path (20). The tapered portion (81*a*) has a diameter increasing toward the internal flow path (20).

When the operator pulls the temperature sensor (50) out of the internal flow path (20), the detector (51) moves along the tapered portion (81*a*). This can keep the detector (51) and the lead wire (52) from being caught by the end of the holder (80).

Advantages of Embodiment

The guide member (60) extends from the opening of the casing (11) toward the internal space (20). The guide member (60) guides the temperature sensor (50) to the internal space (20). The detector (51) and the lead wire (52) of the temperature sensor (50) are held by the guide member (60). The detector (51) and the lead wire (52) of the temperature sensor (50) being held by the guide member (60) make it possible to detect the temperature at a specific location in the internal space (20).

The guide member (60) has the curved portion (72). The curved portion (72) is formed in a curved shape in plan view. This configuration allows the temperature sensor (50) to be arranged at a specific location in the internal space (20) while keeping a distance that can reduce conduction of heat from the outside.

The guide member (60) includes the first guide portion (71) and the second guide portion (73). The second guide portion (73) extends in a direction at a right angle or an obtuse angle relative to the first guide portion (71). Thus, the temperature sensor (50) inserted from the opening of the casing (11) can smoothly move along the first guide portion (71) and the second guide portion (73).

The guide member (60) has the first wall (70) and the second wall (75). The second wall (75) has the inclined portion (76) that is closer to its distal end than the curved portion (72). The inclined portion (76) is inclined to approach the first wall (70) in plan view. Thus, the detector (51) can be easily guided toward the distal end of the guide member (60) when inserting the temperature sensor (50).

The distal end portion of the guide member (60) guides the detector (51) substantially horizontally. This can keep water from accumulating at the junction between the detector (51) and the lead wire (52) of the temperature sensor (50).

The detector (51) may be guided upward by changing the posture of the guide member (60). Alternatively, with the distal end portion of the guide member (60) kept in a substantially horizontal posture, an inclined surface that is inclined upward toward the distal end of the guide member (60) may be provided in the interior space (65) so that the detector (51) is guided upward.

The guide member (60) covers the detector (51). Thus, the detector (51) can be protected, and the temperature sensor (50) can be easily guided to a specific location in the internal space (20). In this embodiment, the detector (51) and the lead wire (52) of the temperature sensor (50) arranged in the internal flow path (20) are all covered by the guide member (60). However, it is at least required that the detector (51) be covered.

The holder (80) guides the temperature sensor (50) to the guide member (60) from the outside. The temperature sensor (50) is fixed to the holder (80) via the elastic member (53) provided on the lead wire (52). Thus, the temperature sensor (50) is inserted until the elastic member (53) is fixed to the holder (80), keeping the degree of insertion of the temperature sensor (50) from varying.

The tapered portion (56) of the elastic member (53) is at least partially arranged inside the holder (80). This can keep the elastic member (53) and the holder (80) airtight.

The lock member (90) fixes the holder (80) and the elastic member (53). The lock member (90) has the insertion hole (93) and the slit (94). The restriction portion (95) restricts an increase in the opening width of the slit (94).

This configuration allows the lock member (90) to be attached to and detached from the lead wire (52) of the temperature sensor (50) through the slit (94). The restriction portion (95) can keep the slit (94) from accidentally opening.

The holder (80) guides the temperature sensor (50) to the guide member (60) from the outside. The holder (80) has the tapered portion (81*a*) at the inner peripheral edge of the end closer to the internal space (20). The tapered portion (81*a*) has a diameter increasing toward the internal space (20). This can keep the detector (51) and the lead wire (52) from being caught by the end of the holder (80) when the temperature sensor (50) is pulled out of the internal space (20).

In the known techniques, a cylinder for arranging the temperature sensor has been formed into a single piece extending from the outside to the internal space. This brings a problem in that heat from the outside is conducted to the temperature sensor via the cylinder. To solve this problem, this embodiment has achieved a configuration that reduces the conduction of heat from the outside to the temperature sensor.

The first passage member (80) allows the internal space (20) to communicate with the outside and guides the temperature sensor (50) into the internal space (20). The second passage member (60) is arranged on the side of the first passage member (80) closer to the internal space (20) and allows the temperature sensor (50) to be arranged in the internal space (20). The first passage member (80) and the second passage member (60) are formed as separate members. This configuration can reduce the conduction of heat to the temperature sensor (50) from the outside.

The first passage member (80) and the second passage member (60) are arranged apart from each other. This configuration can reduce the conduction of heat to the temperature sensor (50) from the outside.

The first passage member (80) is fixed to the exterior wall (13). The second passage member (60) is fixed to the interior wall (14). This configuration can reduce the conduction of heat to the temperature sensor (50) from the outside.

The first passage member (80) has the passage body (81) and the protrusion (84). The first passage member (80) is configured to be switchable between the first position and the second position. At the first position, the protrusion (84) is able to pass through the hole (13*a*) of the exterior wall (13). At the second position, the protrusion (84) engages with the surface of the exterior wall (13) facing the internal space (20). This allows easy assembly of the first passage member (80) and the exterior wall (13).

The first passage member (80) is configured to be switchable between the first position and the second position when the passage body (81) rotates. Thus, rotating the first passage member (80) allows easy assembly of the first passage member (80) and the exterior wall (13).

The temperature sensor (50) has the detector (51) and the lead wire (52). The second passage member (60) has the curved portion (72). The curved portion (72) is formed in a curved shape in plan view. This configuration allows the temperature sensor (50) to be arranged at a specific location in the internal space (20) while keeping a distance that can reduce conduction of heat from the outside.

In the known techniques, the distal end portion of the temperature sensor has been exposed from the cylinder, and the temperature sensor may possibly be damaged due to vibration during transportation of the container. Extending the cylinder to cover the distal end portion of the temperature sensor may be a possible solution, but this brings poor ventilation to the temperature sensor. To address this problem, this embodiment has achieved a configuration that protects the temperature sensor and improves the ventilation to the temperature sensor.

The cover member (60) is arranged closer to the internal space (20) than the passage of the casing (11). The cover member (60) covers the temperature sensor (50). The cover member (60) is provided with a plurality of holes (68). The cover member (60) covering the temperature sensor (50) can protect the temperature sensor (50). The cover member (60) having the plurality of holes (68) can improve the ventilation to the temperature sensor (50).

The holes (68) have an inner diameter less than or equal to 3 mm. The cover member (60) having the plurality of holes (68) can improve the ventilation to the temperature sensor (50).

The holes (68) are arranged in a zigzag pattern. This arrangement can increase the number of holes (68) formed in the cover member (60), improving the ventilation to the temperature sensor (50).

The cover member (60) has the curved portion (72) and the linear portion (73). The curved portion (72) is formed in a curved shape in plan view. The linear portion (73) extends linearly and continuously from the curved portion (72). This configuration allows the temperature sensor (50) to be arranged at a specific location in the internal space (20) while keeping a distance that can reduce conduction of heat from the outside.

The cover member (60) is provided with the plurality of holes (68) that are formed along the flow direction of the air. This allows the air to easily flow through the holes (68) of the cover member (60), improving the ventilation to the temperature sensor (50).

The cover member (60) includes the first cover portion (77). The first cover portion (77) overlaps the interior space (65) when viewed in the flow direction of the air. The plurality of holes (68) are formed in the first cover portion (77). Thus, the holes (68) formed in the first cover portion (77), which is a surface of the cover member (60) through which the air passes, can improve the ventilation to the temperature sensor (50).

The cover member (60) includes the first cover portion (77) and the second cover portion (78). No holes (68) are formed in the second cover portion (78). With no holes (68) formed in the second cover portion (78) that is different from the first cover portion (77), which is a surface of the cover member (60) through which the air passes, the cover member (60) can be kept rigid.

The cover member (60) includes the first member (61), the second member, and the coupling portions (63) that are made of resin. The first member (61) and the second member (62) are formed into one piece with the fold (64) interposed therebetween. The coupling portions (63) connect the first member (61) and the second member (62). The cover member (60) having the plurality of holes (68) and improving the ventilation can be easily formed by resin molding.

The cover member (60) has the curved portion (72). The curved portion (72) is formed in a curved shape in plan view. The coupling portions (63) are provided in the curved portion (72). Even if the temperature sensor (50) inserted from the passage in the casing (11) presses the curved portion (72) of the cover member (60), the coupling portions (63) can keep the cover member (60) from opening accidentally.

The cover member (60) has the linear portion (73). The linear portion (73) extends linearly in plan view. The linear portion (73) is provided with the fold (64). Thus, the cover member (60) can be easily formed by resin molding.

Other Embodiments

The above-described embodiment may have the following configuration.

The shipping container (1) may be used for land transportation. In this case, the shipping container (1) is conveyed by a land transporter, such as a vehicle. Specifically, the shipping container (1) is mounted on a trailer.

While the embodiments and variations have been described above, it will be understood that various changes in form and details can be made without departing from the spirit and scope of the claims. The embodiments, the variations, and the other embodiments may be combined and replaced with each other without deteriorating intended functions of the present disclosure. The ordinal numbers such as "first," "second," "third," . . . described above are used to distinguish the terms to which these expressions are given, and do not limit the number and order of the terms.

INDUSTRIAL APPLICABILITY

As can be seen from the foregoing description, the present disclosure is useful for a refrigeration apparatus for shipping and a shipping container.

EXPLANATION OF REFERENCES

1 Shipping Container
2 Container Body
10 Refrigeration Apparatus for Shipping
11 Casing
13 Exterior Wall
13*a* Hole
14 Interior Wall 20 Internal Flow Path (Internal Space)
50 Temperature Sensor
51 Detector
52 Lead Wire
53 Elastic Member
56 Tapered Portion
60 Guide Member (Second Passage Member, Cover Member)
61 First Member
62 Second Member
63 Coupling Portion
64 Fold
65 Interior Space
68 Hole
70 First Wall
71 First Guide Portion
72 Curved Portion
73 Second Guide Portion (Linear Portion)
75 Second Wall
76 Inclined Portion
77 First Cover Portion
78 Second Cover Portion
80 Holder (First Passage Member)
81 Holder Body (Passage Body)
81*a* Tapered Portion
84 Protrusion
90 Lock Member
93 Insertion Hole
94 Slit
95 Restriction Portion

The invention claimed is:

1. A refrigeration apparatus for shipping, comprising:
a casing to be attached to an open end of a container body, the casing having an opening that allows an internal space to communicate with outside;
a temperature sensor configured to detect a temperature of the internal space; and
a guide member that extends from the opening to the internal space and guides the temperature sensor to the internal space, wherein
air flows around the guide member in a predetermined flow direction,
the guide member has a curved portion that is arranged in the internal space and is curved as viewed from the flow direction of the air,
the temperature sensor includes a detector configured to detect the temperature of the internal space and a lead wire connected to the detector, and
the guide member holds the detector and the lead wire.

2. The refrigeration apparatus for shipping of claim 1, wherein
the guide member includes a first guide portion extending from the opening and a second guide portion extending continuously from the first guide portion in a direction at a right angle or an obtuse angle relative to the first guide portion as viewed from the flow direction of air.

3. The refrigeration apparatus for shipping of claim 1, wherein
the guide member has a first wall and a second wall facing the first wall, and
the second wall has an inclined portion that is closer to a distal end of the second wall than the curved portion and is inclined to approach the first wall as viewed from the flow direction of air.

4. The refrigeration apparatus for shipping of claim 1, wherein
at least a distal end portion of the guide member arranged in the internal space is configured to guide the detector substantially horizontally or upward.

5. The refrigeration apparatus for shipping of claim 1, wherein
the guide member covers the detector.

6. The refrigeration apparatus for shipping of claim 1, further comprising:
a holder in a tubular shape, the holder configured to guide the temperature sensor into the guide member from the outside, wherein
the lead wire is provided with an elastic member, and
the temperature sensor is fixed to the holder via the elastic member.

7. The refrigeration apparatus for shipping of claim 6, wherein
the elastic member has a tapered portion, and
the tapered portion is at least partially arranged inside the holder.

8. A refrigeration apparatus for shipping, comprising:
a casing to be attached to an open end of a container body, the casing having an opening that allows an internal space to communicate with outside;
a temperature sensor configured to detect a temperature of the internal space; and
a guide member that extends from the opening to the internal space and guides the temperature sensor to the internal space, wherein
the temperature sensor includes a detector configured to detect the temperature of the internal space and a lead wire connected to the detector, and
the guide member holds the detector and the lead wire,
the refrigeration apparatus further comprising a holder in a tubular shape, the holder configured to guide the temperature sensor into the guide member from the outside, wherein the lead wire is provided with an elastic member, and the temperature sensor is fixed to the holder via the elastic member,
the refrigeration apparatus further comprising a lock member configured to fix the holder and the elastic member, wherein
the lock member has an insertion hole in which the temperature sensor is inserted and a slit that opens in a radial direction and is connected to the insertion hole, and
the lock member has a restriction portion configured to restrict an increase in an opening width of the slit.

9. The refrigeration apparatus for shipping of claim 1, further comprising:
a holder in a tubular shape, the holder configured to guide the temperature sensor into the guide member from the outside, wherein
an inner peripheral edge of an end of the holder closer to the internal space is formed into a tapered portion having a diameter increasing toward the internal space.

10. The refrigeration apparatus for shipping of claim 1, further comprising:
a first passage member provided for the casing to allow the internal space to communicate with the outside and guide the temperature sensor into the internal space; and
a second passage member that is arranged on the side of the first passage member closer to the internal space and allows the temperature sensor to be arranged in the internal space, wherein
the second passage member is the guide member, and the first passage member and the second passage member are formed as separate members.

11. The refrigeration apparatus for shipping of claim 10, wherein the casing has an exterior wall facing the outside and an interior wall facing the internal space, the first passage member is fixed to the exterior wall, and the second passage member is fixed to the interior wall.

12. The refrigeration apparatus for shipping of claim 11, wherein a hole is formed in the exterior wall, and the first passage member includes a passage body inserted into the hole and a protrusion provided on an outer peripheral surface of the passage body, the protrusion being switchable between a first position at which the protrusion is able to pass through the hole and a second position at which the protrusion engages with a surface of the exterior wall facing the internal space.

13. The refrigeration apparatus for shipping of claim 1, wherein the casing has a passage that connects the outside and the internal space, the refrigeration apparatus for shipping further includes a cover member that is arranged closer to the internal space than the passage and covers the temperature sensor, the cover member is the guide member, and the cover member is provided with a plurality of holes.

14. The refrigeration apparatus for shipping of claim 13, wherein the cover member includes a curved portion formed in a curved shape as viewed from the flow direction of air and a linear portion extending linearly and continuously from the curved portion.

15. The refrigeration apparatus for shipping of claim 13, wherein air flows around the cover member in a predetermined flow direction, and the plurality of holes are formed along the flow direction of the air.

16. The refrigeration apparatus for shipping of claim 15, wherein the cover member forms therein an interior space in which the temperature sensor is arranged, the cover member includes a first cover portion overlapping the interior space when viewed in the flow direction of the air, and the plurality of holes are formed in the first cover portion.

17. A refrigeration apparatus for shipping, comprising:

a casing to be attached to an open end of a container body, the casing having an opening that allows an internal space to communicate with outside;

a temperature sensor configured to detect a temperature of the internal space; and a guide member that extends from the opening to the internal space and guides the temperature sensor to the internal space, wherein the temperature sensor includes a detector configured to detect the temperature of the internal space and a lead wire connected to the detector, the guide member holds the detector and the lead wire, the casing has a passage that connects the outside and the internal space, the refrigeration apparatus for shipping further includes a cover member that is arranged closer to the internal space than the passage and covers the temperature sensor, the cover member is the guide member, the cover member is provided with a plurality of holes, and wherein the cover member includes: a first member made of resin; a second member that is made of resin and formed into one piece with the first member with a fold interposed therebetween so that the temperature sensor is covered between the first member and the second member; and a coupling portion that connects the first member and the second member.

18. A shipping container, comprising:

the refrigeration apparatus for shipping of claim 1; and a container body.

* * * * *